No. 770,905. Patented September 27, 1904.

UNITED STATES PATENT OFFICE.

LEVI HORNOR, OF WICHITA, KANSAS.

BLACKBOARD COMPOUND.

SPECIFICATION forming part of Letters Patent No. 770,905, dated September 27, 1904.

Application filed April 15, 1904. Serial No. 203,354. (No specimens.)

*To all whom it may concern:*

Be it known that I, LEVI HORNOR, a citizen of the United States, residing at Wichita, in the county of Sedgwick and State of Kansas, have invented a new and useful Blackboard Compound, of which the following is a specification.

This invention relates to a composition of matter used in the construction of blackboards, and has for its object to provide an improved compound for application to the walls of buildings or other surfaces where the construction of a blackboard is desirable.

With this object in view the invention consists in a composition or compound formed of the following ingredients, to wit: one part plaster-of-paris, two parts lampblack, and three parts Portland cement.

The above ingredients are thoroughly intermixed and blended into a homogeneous compound, a sufficient quantity of water being added thereto to give the same the consistency of paste. The compound is then spread upon the walls of the buildings or other surfaces to be coated with a trowel or other tool, or the same may be molded in slabs of suitable lengths and secured to the walls in any desired manner. The crystallization or setting holds the lampblack unchanged in the mixture, forming a solid impervious cake of the same density and color throughout its mass.

A compound thus prepared presents a hard black finish, which will effectually resist the action of water, will not rub off, and will readily take chalk-marks which may be easily erased.

Having thus described the invention, what I claim is—

1. A composition of matter for blackboards and like surfaces, the same consisting of plaster-of-paris, lampblack, Portland cement and water combined substantially in the manner and proportions specified.

2. A composition of matter for blackboards and like surfaces, the same consisting of one part plaster-of-paris, two parts lampblack, and three parts Portland cement, the whole combined with water in the manner substantially as described.

In testimony that I claim the foregoing as my own I have hereto affixed my signature in the presence of two witnesses.

LEVI HORNOR.

Witnesses:
 IKE GOLDSMITH,
 KARL ZEININGER.